United States Patent [19]
Barlou et al.
[11] Patent Number: 4,927,564
[45] Date of Patent: May 22, 1990

[54] METHOD FOR CONDITIONING RADIOACTIVE OR TOXIC WASTES IN THERMOSETTING RESINS

[75] Inventors: André Barlou, La Tour D'Aigues; Alexandre Beltritti, Manosque; Patrick Gramondi, Saint Cannat; Hugues Vidal, Pertuis, all of France

[73] Assignee: Commissariat a l'Energie Atomique, Paris, France

[21] Appl. No.: 272,716

[22] Filed: Nov. 17, 1988

[30] Foreign Application Priority Data

Nov. 23, 1987 [FR] France ................................ 87 16199

[51] Int. Cl.[5] ............................ G21F 9/16; C08F 8/32

[52] U.S. Cl. .................................... 252/628; 106/284; 210/728; 210/729; 210/735; 210/751; 252/631; 427/6; 427/221; 427/385.5; 427/386; 427/407.1; 521/32

[58] Field of Search ................ 252/628, 631; 210/728, 210/729, 732, 735, 781; 106/284; 427/6, 221, 385.5, 386, 407.1; 521/32

[56] References Cited

U.S. PATENT DOCUMENTS

| | | | |
|---|---|---|---|
| 3,723,338 | 3/1973 | Godfrey | 252/628 |
| 4,122,048 | 10/1978 | Buchwalder et al. | 252/628 |
| 4,315,831 | 2/1982 | Morin et al. | 252/628 |
| 4,405,512 | 9/1983 | Filter et al. | 252/628 |
| 4,599,196 | 7/1986 | de Tassigny | 252/628 |
| 4,764,305 | 8/1988 | de Tassigny | 252/628 |
| 4,839,102 | 6/1989 | Kertesz et al. | 252/628 |

FOREIGN PATENT DOCUMENTS

| | | |
|---|---|---|
| 0192543 | 2/1986 | European Pat. Off. . |
| 2471030 | 11/1980 | France . |
| 2544909 | 10/1984 | France . |

*Primary Examiner*—Howard J. Locker
*Attorney, Agent, or Firm*—Pearne, Gordon, McCoy & Granger

[57] ABSTRACT

The invention concerns a method for conditioning in a thermosetting resin a quantity of waste stored in water.

According to the invention, a liquid hardening agent, immiscible with water and having a density greater than that of the water, is used in order to harden the resin; this hardening agent is then mixed with the waste stored in the water and then the waste is left to decant in the hardening agent; then the water present above the decanted waste transferred into the liquid hardening agent is extracted and the waste transferred into the liquid hardening agent is mixed with the epoxy resin so as to obtain a solid block.

In particular, the waste may be ion exchanger resins. Adding of the hardening agent to the waste stored in the water makes it possible to limit a temperature rise during hardining and to obtain solid products having an improved density.

10 Claims, No Drawings

METHOD FOR CONDITIONING RADIOACTIVE OR TOXIC WASTES IN THERMOSETTING RESINS

FIELD OF THE INVENTION

The object of the present invention is to produce a method for conditioning radioactive or toxic wastes in thermosetting resins.

BACKGROUND OF THE INVENTION

More precisely, it concerns the conditioning of radioactive or toxic waste stored in water, and especially radioactive waste comprising ion exchanger resins and/or acid compounds.

In nuclear installations, ion exchanger resins are particularly used to purify the contaminated water, especially the waste of these installations. After some time, these resins are subjected to degradation phenomena and consequently lose their effectiveness. Given the fact that, during their use these spent resins have immobilized a certain number of radioelements, it is therefore necessary to condition them in a suitable material so as to ensure that their radioactivity is properly retained.

Given the fact that waste consisting of acid-function materials is also found in nuclear installations, for example acid compounds, such as salts like lead iodide in the form of a powder or grains in a humid environment, it is therefore necessary to also carry out conditioning after use so as to ensure that the radioactivity immobilized on the materials is properly retained.

Amongst the methods currently developed to process this type of waste, there are known methods for conditioning in thermosetting resins, such as epoxy resins. These methods are detailed in the French patents FR-A-2 251 081, FR-A-2 361 724, FR-A-2 544 909 and FR-A-2 577 709.

In the first three French patents which apply in particular to the treatment of exchanger resins, provision has been made to either directly encapsulate the ion exchanger resins in the thermosetting resin (FR-A-2 251 081), or to subject the resins to a pretreatment so as to saturate their active centers by a basic compound and afterwards encapsulate them in the thermosetting resin (FR-A-2 361 724), or to use suitable aminated hardening agents with epoxy resins in order to directly embody an encapsulation so as to carry out this saturation at the time of hardening and to avoid pretreatment by a basic compound. In all these cases, the waste stored in the water is first of all dried before being incorporated in the thermosetting resin and hardening agent mixture so as not to encapsulate the water in which they have been transported and stored.

However, implementation of this preliminary stage involves certain drawbacks. In fact, at the time of final mixing of the dried waste with the resin and the hardening agent, it is difficult to stop air entering the mixture owing to the viscosity of the products used and the rise in temperature resulting from the exothermicity of the reactions. This presence of air constitutes a drawback, since firstly it reduces the density of the solid block and secondly it increases porosity to the detriment of the confinement power.

Therefore, it would be advisable to improve the methods previously described so as to prevent air from entering into the final product.

SUMMARY OF THE INVENTION

The specific object of the present invention is to produce a method for conditioning in thermosetting resin a quantity of waste stored in water and enabling this drawback to be avoided.

This method consists of mixing the waste with the thermosetting resin and the liquid hardening agent, wherein a hardening agent is immiscible with water and having a density greater than that of the water, and wherein this method comprises the following stages :

(a) adding and mixing the liquid hardening agent with the waste stored in the water, (b) decanting the waste with the liquid hardening agent, (c) extracting the water present above the decanted waste and transferred into the liquid hardening agent, and (d) mixing the waste transferred into the liquid hardening agent with the thermosetting resin.

In the method of the invention, the resin hardening agent is used as a liquid phase for transferring waste into the thermosetting resin. This makes it possible to stop air entering the mixture and thus facilitates the water-extraction operation, since this merely involves allowing the solid waste to decant for a few minutes so as to be able to easily extract the water located above the waste transferred in the liquid phase of the hardening agent. Accordingly, the inclusion of air and encapsulation of the waste storage water inside the thermosetting resin are avoided.

In the method of the invention, it is possible to use the thermosetting resins for suitably encapsulating radioactive and toxic wastes, provided these thermosetting resins can be hardened by a liquid hardening agent having a density greater than that of the water.

By way of example relating to such resins, unsaturate polyester resins, such as polyvinyl resins, epoxy resins and phenolic resins, can be used.

In the invention, it is preferable to use an epoxy resin which can be hardened by active hydrogen hardening agents such as amines, phenols, polyacids and polyhydroxy alcohols.

Generally, an aminated hardening agent is used which can be introduced in its pure state or in the form of a solution in a suitable diluant or even in the form of an adduct, i.e. the product of the reaction of a small quantity of epoxy resin with an aminated compound, to which a diluant may also be added if required in order to obtain a liquid phase having the desired viscosity.

By way of example of the diluants able to be used, one of these diluants may be benzyl alcohol.

The method of the invention can be used for treating different types of toxic or radioactive waste stored in water.

By way of example, the radioactive waste may be spent ion exchanger resins, precipitation mud derived, for example, from the chemical treatment of radioactive waste water, activated carbon originating from infiltration and purification installations, precipitates being formed, for example, during the storage of radioactive residual solutions and residual deposits being formed, for example, in storage tanks.

By way of example relating to toxic waste, said waste may be arsenic and cadmium derivatives, cyanides, chromium drivatives, mercury and its salts, tin and antimony derivatives, thallium deivatives, solid residues comprising vegetable protective agents, insecticides, fungicides, etc.

The method of the invention applies in particular for treating radioactive waste comprising ion exchanger resins and/or acid compounds.

In this case, according to a preferred mode for implementing the method of the invention, an epoxy resin and a liquid aminated hardening agent able to saturate the active centers of the ion exchanger resins and/or the acid compounds are used, as described in the French patent No. FR-A-2 544 909.

The aminated hardening agent may include at least one aminated compound selected from the group consisting of cyclo-aliphatic and aromatic amines, aromatic and cyclo-aliphatic polyamines, amine propylene derivatives and polyaminoamides.

Preferably, the aminated hardening agent is constituted by an adduct which is the product of the reaction of a small quantity of epoxy resin with one of the aforesaid aminated compounds. A diluant can also be added so as to obtain a liquid phase having the desired viscosity.

When such aminated hardener agents are used with ion exchanger resins, it is generally required to introduce these in excess with respect to the quantity required to obtain hardening of the epoxy resin and to also saturate the active sites of the epoxy resin.

Also, in order to avoid using such an excess amount, it would be preferable to select aminated hardening agents contituted by a mixture of an amine or aromatic polyamine and an amine or aliphatic or cyclo-aliphatic polyamine, as described in the patent FR-A-2 544 909.

When such a mixture is used, the amine or aromatic polyamine may appear in the form of an adduct with a small quantity of the epoxy resin. It is also possible to add to it a non-reactive diluant, such as benzyl alcohol.

In all these cases, the liquid hardening agent may also include a hardening accelerator constituted, for example, by the product of the reaction of acrylic acid, benzoic acid, salicylic acid or resorcin phenol with an aminated compound, such as diaminodiphenylmethane. It is also possible to add to the liquid hardening agent other additives, such as compounds capable of preventing decantation of the radioactive or toxic waste inside the resin during hardening, said compounds being, for example, a thixotrope agent or even a product such as a pitch solution, as described in the French patent n· FR-A-2 577 709.

In this preferred mode for implementing the method of the invention, the fact of adding the aminated liquid hardening agent before mixing the waste with the epoxy resin makes it possible to limit the exothermicity of the hardening reaction. In effect, at the time of conditioning the ion exchanger resins, the aminated hardener agent reacts with the active sites of the resins so as to neutralize the latter and a rise of temperature is generally obtained due to exothermicity of the neutralization reaction which is added to the temperature increase due to neutralization which is added to the temperature increase due to the hardening reaction, which is also exothermic. Now, in order to obtain solidified products having satisfactory characteristics, it is essential to not exceed 100° C., which poses certain problems.

In the method of the invention, this neutralization reaction is conducted in water before the actual hardening reaction, and the heat produced at the time of this neutralization reaction is diluted or eliminated by the water. Owing to this, the initial temperature of the polymerization reaction is no longer affected by this neutralization reaction and the maximum temperature reached during hardening of the epoxy resin is at least 10° C. lower than the one reached when the dried waste is directly mixed with the resin and the hardening agent.

Moreover, the fact of adding the liquid hardening agent to the waste stored in the water simplifies the operation for mixing the resin with the waste. In effect, the hardening agent and waste mixture is more fluid than the waste alone and less energy is consumed for the mixing operation.

The following examples, in no way restrictive, illustrate the conditioning of the ion exchanger resins in an epoxy resin by the method of the invention.

EXAMPLE 1

In this example, in an epoxy resin, ion exchanger resins in the form of balls are conditioned, said resins being constituted by a 60% by weight mixture of anionic exchanger resins in an OH- IRA 400 form commercialized by ROHM and HAAS and a 40% by weight mixture of alkaline resins in a Na IR 120 form commercialized by ROHM and HAAS.

In this example, an epoxy resin is used constituted by an ether diglycidyl of biphenol A having an epoxy equivalent of about 190 diluted by ether diglycidyl neopentyl and commercialized by CDF Chimie under the reference MN 201T and a hardening agent constituted by the product sold under the reference D6M5 by CDF Chimie, which is composed of a cyclo-aliphatic polyamine having an amine equivalent of about 63 and a diaminodiphenylmethane and epoxy resin MN 201 T having an amine equivalent of about 130.

The quantities of the resin and hardening agent used are respectively 100 and 60 parts by weight with an ion exchanger resins weight ratio (thermosetting resin +hardener agent) equal to 1.

For a final volume of 200 l, firstly 110 kg of the ions exchanger resins mixture with their transfer water is introduced into a 225 L container. Then 41.3 kg of the hardener agent D6M5 is added to this and the mixture is then left to decant for several minutes so that the hardening agent D6M5 and the ion exchanger resins are driven to the bottom of the container. Then the supernatant water is eliminateed by pumping, then 68.7 kg of the epoxy resin MN 201 T is added and all the above is mixed using an expendable blade agitator driven by an electric motor for about 5 minutes.

Then the mixture is left to harden for 24 hours at ambient temperature and the density of the product obtained is determnied.

In the annexed table 1, the density obtained is indicated, as well as the conditions used to carry out conditioning.

COMPARATIVE EXAMPLE 1

In this example, conditioning is effected in the same epoxy resin of the same ion exchanger resin mixture by using the method of the prior art described in the patent FR-A- 2 544 909.

In this case and for a final volume of 200 l, firstly the ion exchanger resin mixture is dried for 8 minutes in order to eliminate the storage water, and then 100 kg of the dried ions exchanger resin mixture is introduced into the 225 L container. Then 62.5 kg of the epoxy resin MN 201T and 37.5 kg of the hardener agent D6 M5 are added and the mixture is agitated by also using an expendable blade agitator driven by an electric motor and the product is left to harden at ambient temperature. Then the density of the product obtained is determined after hardening.

The results and the conditions used for conditioning are also indicated in the annexed table 1.

This table shows that the method of the invention makes it possible to obtain a density gain of 10%, a time gain of 160% concerning the water pumping period, a gain of 12% concerning the maximum temperature reached during hardening and a 360% gain concerning the intensity required to agitate the mixture.

Thus, it will be observed that the method of the invention is more certain as regards the maximum temperature reached, since the safety margin in relation to the limit temperature of 100° C. has widely increased. Similarly, the product obtained has improved safety characteristics as it is more dense. Finally, a savings gain is obtained concerning the energy required to carry out agitation, as well as concerning the water pumping time.

EXAMPLE 2

In this example, in the same way as in example 1, a mixture of the ion exchanger resins in the form of balls is conditioned, said mixture being identical to that of example 1, but by using :

a Ciba Geigy epoxy resin, reference LMB 4203, a Ciba Geigy hardener agent, reference LMB 4278, a Ciba Geigy thixotrope agent, reference LMB 4212.

In this case, the thixotrope agent is added to the hardening agent and the resin, hardening agent and thixotrope agent quantities are respectively 90, 60 and 10 parts by weight. The ion exchanger resins (epoxy resin +hardener agent +thixotrope agent) weight ratio is equal to 1.

Operation takes place in the same way as in example 1, but using the quantities of an ion exchanger resin, epoxy resin, the hardening agent and thixotrope agent given in the annexed table 2.

The density obtained and the conditions for executing conditioning are indicated in this table 2.

COMPARATIVE EXAMPLE 2

In this example, the same ion exchanger resin mixture, epoxy resin, hardening agent and thixotrope agent are used as in example 2, but conditioning is effected by using the method of the prior art, as in the comparative example n· 1.

The quantities used, the density of the product obtained and the conditions of the reaction are given in the annexed table 2.

This table shows that the method of the invention makes it possible to obtain :

a 9% gain concerning the density of the finished product, an 18% gain concerning the maximum temperature reached at the time of polymerization, a 320% gain concerning the intensity required to carry out agitation, and a 100% gain concerning the water pumping time.

The method of the invention thus allows for numerous advantages to be obtained with respect to the method of the prior art.

TABLE 1

| Conditions (for a final volume of 200 l) | Example 1 | Comparative example 1 |
|---|---|---|
| Quantity of ion exchanger resins | 110 kg | 100 kg |
| Quantity of epoxy resin | 41.3 kg | 62.5 kg |
| Quantity of hardening agent | 68.7 kg | 37.5 kg |
| Storage water pumping time | 3 mins | 8 mins |
| Maximum torque for agitation in the container (motor intensity) | 5 A | 23 A |
| Maximum temperature at time of hardening | 83° C. | 93° C. |
| Density (theoretical density 1.4325) | 1.10 ± 0.01 | 1.00 ± 0.01 |

TABLE 2

| Conditions (for a final volume of 200 l) | Example 2 | Comparative example 2 |
|---|---|---|
| Quantity of ion exchanger resins | 111 kg | 102 kg |
| Quantity of epoxy resin | 62.5 kg | 53.4 kg |
| Quantity of hardening agent | 41.6 kg | 38.3 kg |
| Quantity of thixotrope agent | 6.9 kg | 6.3 kg |
| Storage water pumping time | 4 mins | 8 mins |
| Maximum torque for agitation in the container (motor intensity) | 5 A | 21 A |
| Maximum temperature at time of hardening | 84° C. | 99.5° C. |
| Density (theoretical density 1.4325) | 1.11 ± 0.01 | 1.02 ± 0.01 |

What is claimed is:

1. A method for conditioning in a thermosetting resin a quantity of radioactive or toxic waste stored in water, said resin being curable by the liquid hardening agent which is immiscible with water and has a density greater than that of water, comprising the sequential steps of:
(a) addition and mixing of the liquid hardening agent with the waste stored in the water,
(b) decantation of the waste with the liquid hardening agent,
(c) extraction of the water present above the liquid hardener agent in which the waste is transferred, and
(d) mixing of the waste transferred into the liquid hardening agent with the thermosetting resin.

2. A method according to claim 1, wherein the thermosetting resin is an epoxy resin.

3. A method according to claim 2, wherein the waste is selected from the group consisting of ion exchanger resins and acid compounds.

4. A method according to claim 2, wherein the liquid hardening agent is an aminated hardener.

5. A method according to claim 4, wherein the aminated hardening agent includes at least one aminated compound selected from the group consisting of cycloaliphatic and aromatic amines, aromatic and cyclo-aliphatic polyamines, amine propylene derivatives and polyaminoamides.

6. A method according to claim 5, wherein the aminated hardening agent is an adduct which is the product of the reaction of a small quantity of the epoxy resin with the aminated compound.

7. A method according to claim 2 or 3, wherein the liquid hardening agent is a mixture of an amine or aromatic polyamine and an amine or a cyclo-aliphatic or aliphatic polyamine.

8. A method according to claim 7, wherein the amine or aromatic polyamine is in the form of an adduct with a small quantity of the epoxy resin.

9. A method accoding to claim 1, wherein the liquid hardening agent includes a thixotropic agent.

10. A method according to claim 1, wherein the liquid hardening agent comprises pitch.

* * * * *